F. E. GLOVER.
Cotton-Chopper.
No. 201,240. Patented March 12, 1878.
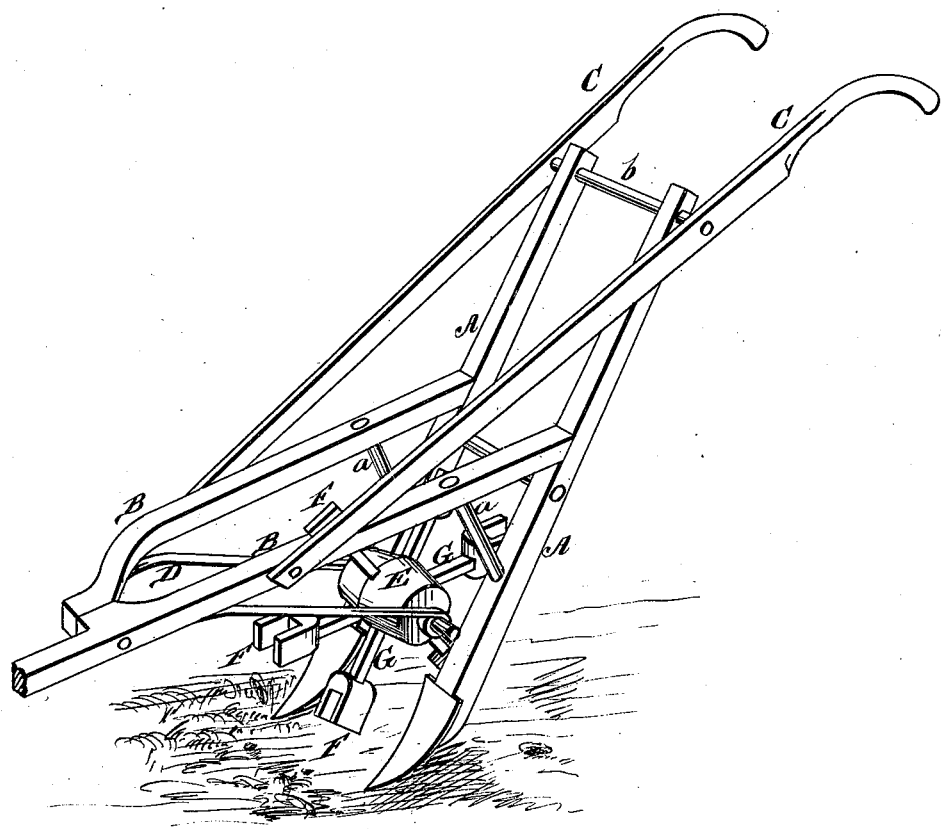
WITNESSES
INVENTOR.
Francis E. Glover.
ATTORNEYS.

UNITED STATES PATENT OFFICE.

FRANCIS E. GLOVER, OF REYNOLDS, GEORGIA.

IMPROVEMENT IN COTTON-CHOPPERS.

Specification forming part of Letters Patent No. 201,240, dated March 12, 1878; application filed January 19, 1878.

*To all whom it may concern:*

Be it known that I, FRANCIS E. GLOVER, of Reynolds, in the county of Taylor and State of Georgia, have invented a new and valuable Improvement in Cotton-Choppers; and I do hereby declare that the following is a full, clear, and exact description of the construction and operation of the same, reference being had to the annexed drawing, making a part of this specification, and to the letters of reference marked thereon.

The drawing is a representation of a perspective view of my cotton-chopper.

This invention is designed as an improvement on that class of cotton-choppers having a revolving hub with a series of spokes provided with cups and arranged between plows; and the novelty consists in the construction and arrangement of the parts, as will be hereinafter more fully set forth, and pointed out in the claims.

The annexed drawing, to which reference is made, fully illustrates my invention.

A A represent two plow-stocks attached to the rear ends of two plow-beams, B B, which are connected at their front ends. a a are braces connecting the stocks and the beams. C C are the handles secured to the beams B B, and having a round, b, connecting them, said round passing through the upper ends of the stocks A A.

At the front ends of the plow-beams B B is secured a double or U-shaped spring, D, the arms of which extend downward and rearward, as shown. The lower rear ends of these arms form bearings for the axle or journals of the rotating wheel E G F. This wheel is composed of a cast-iron hub, E, in which are fastened the wrought-iron spokes G G, and on the end of each spoke is attached a cup, F, which is adjustable out and in on the spoke.

By moving the cups inward on the spokes, the distance between the hills is diminished, and by adjusting the cups outward such distance is increased.

The cups have two sides open, which opening is placed longitudinally with the row. The wheel walks over the row, the cups protecting the hill of cotton while the plows on either side are covering everything between the hills.

The object of the double spring is to adapt the wheel to any unevenness in the land without disturbing the plows.

The machine is simple and durable, and almost any one can use it successfully with one horse, thus saving considerable expense.

By covering up the surplus cotton it rots and becomes a fertilizer, thereby greatly benefiting the crop, and, should the machine strike in a vacant place, the operator can stop and uncover the nearest cotton as it is not cut up, as in the machines now generally in use.

The machine is also adapted for the cultivation of rice and sorghum.

What I claim as new, and desire to secure by Letters Patent, is—

1. The open cups F, adjustably attached to the spokes of a revolving wheel, mounted in spring-arms and arranged between two plows, for the purposes set forth.

2. The combination of the plow-frame A B C, the double or U-shaped spring D, wheel E G, and the adjustable open cups F, substantially as and for the purpose set forth.

In testimony that I claim the above I have hereunto subscribed my name in the presence of two witnesses.

FRANCIS E. GLOVER.

Witnesses:
Z. BEELAND,
W. R. GLOVER.